United States Patent [19]

Heiman

[11] Patent Number: 5,652,746

[45] Date of Patent: Jul. 29, 1997

[54] ELECTRONIC TRACK DETECTION METHODS FOR APPARATUS FOR SIMULTANEOUSLY READING MULTIPLE ADJACENT TRACKS OF AN OPTICAL DISK

[75] Inventor: Arie Heiman, Raanana, Israel

[73] Assignee: Zen Research N.V., Curacao, Netherlands

[21] Appl. No.: 558,805

[22] Filed: Nov. 15, 1995

[51] Int. Cl.⁶ .................................................. G11B 7/00
[52] U.S. Cl. .................................. 369/124; 369/44.32
[58] Field of Search ................................ 369/30, 32, 43, 369/44.26, 44.29, 44.32, 44.34, 44.35, 44.41, 47, 48, 49, 54, 58, 124; 360/77.01, 77.02, 77.06; 395/22

[56] References Cited

U.S. PATENT DOCUMENTS

| | | | |
|---|---|---|---|
| 4,460,988 | 7/1984 | Gordon | 369/32 |
| 4,486,870 | 12/1984 | Pettigrew et al. | 369/32 |
| 4,536,866 | 8/1985 | Jerome et al. | 369/112 |
| 4,646,280 | 2/1987 | Toyosawa | 369/50 |
| 4,839,876 | 6/1989 | Fennema | 369/32 |
| 4,918,676 | 4/1990 | Miyasaka | 369/32 |
| 4,972,396 | 11/1990 | Rafner | 369/32 |
| 4,980,376 | 12/1990 | Abate et al. | 369/44.11 |
| 4,989,190 | 1/1991 | Kuroe et al. | 369/32 |
| 5,001,732 | 3/1991 | Nomura et al. | 377/3 |
| 5,081,617 | 1/1992 | Gelbart | 369/112 |
| 5,111,445 | 5/1992 | Psaltis et al. | 369/103 |
| 5,128,919 | 7/1992 | Narahara et al. | 369/97 |
| 5,150,347 | 9/1992 | Yanagi | 369/44.37 |
| 5,153,872 | 10/1992 | Maeda | 369/124 |
| 5,199,017 | 3/1993 | Kagami et al. | 369/44.28 |
| 5,210,726 | 5/1993 | Jackson et al. | 369/32 |
| 5,233,583 | 8/1993 | Reno | 369/44.26 |
| 5,239,530 | 8/1993 | Seo et al. | 369/54 |
| 5,245,597 | 9/1993 | Lee et al. | 369/44.28 |
| 5,274,507 | 12/1993 | Lee | 360/39 |
| 5,295,125 | 3/1994 | Oonishi et al. | 369/44.29 |
| 5,301,174 | 4/1994 | Matoba et al. | 369/44.28 |
| 5,313,448 | 5/1994 | Sukeda et al. | 369/121 |
| 5,333,125 | 7/1994 | Yamamoto | 369/44.34 |
| 5,361,245 | 11/1994 | Yoshida et al. | 369/44.28 |
| 5,394,386 | 2/1995 | Park et al. | 369/44.28 |
| 5,426,623 | 6/1995 | Alon et al. | 369/32 |

*Primary Examiner*—P. W. Huber
*Attorney, Agent, or Firm*—Fish & Neave; Nicola A. Pisano

[57] ABSTRACT

Methods and apparatus are provided for simultaneously tracking multiple data tracks of an optical disk using a detector matrix formed of a plurality of pixels. Based on track pitch, pixel pitch and predetermined point spread functions of the pixels, a series of simultaneous equations based on sampled pixel data is generated and solved to determine an offset distance between a selected pixel and a selected track and corrected values of the sampled pixel data. Alternatively, the series of equations may be generated, based on sample pixel readout values and a series of weighting coefficients, such that solution of the equations enables the position of a selected track may be determined.

22 Claims, 3 Drawing Sheets

ELECTRONIC TRACK DETECTION METHODS FOR APPARATUS FOR SIMULTANEOUSLY READING MULTIPLE ADJACENT TRACKS OF AN OPTICAL DISK

FIELD OF THE INVENTION

This invention relates to methods and apparatus for retrieving information from an optical disk by simultaneously reading multiple adjacent data tracks, and more particularly to methods for electronically tracking the location of multiple adjacent data tracks on an optical disk.

BACKGROUND OF THE INVENTION

Optical disks have become widely used in part due to their relatively high storage capacity and long storage life. Whereas a 3½ inch floppy disk can store 1.44 Mb (megabytes) of data, a 12 centimeter compact (optical) disk can store upwards of 650 Mb. Optical disks have therefore become increasingly popular in recent years, with a number audio and computer data storage products becoming commercially available in a compact-disk (CD) optical disk format. More recent developments in the application of optical disk technology, such as the MultiMedia CD (MMCD) developed by Sony Corp., the Super Density (SD) system developed by Toshiba Corporation, and the new Digital Video Disk (DVD) standard provide ever increasing storage capacities.

A read-only compact disk (CD-ROM) generally includes a 1.2 mm transparent plastic substrate having data encoded in pits that are impressed into the substrate along spiral or concentric data tracks on a 1.6 micron pitch. The pitted substrate is coated with a reflective layer.

To retrieve information from an optical disk, the disk is rotated and light is directed through the transparent substrate onto the reflective layer. The inhomogeneity created in the reflective surface by the pits causes light reflected from the pitted reflective surface to be of lower intensity, while the non-pitted reflective surface between the pits reflects almost all of the incident light. It is this modulation in light intensity that is used for information storage and retrieval.

Light reflected from the optical disk is directed to image detectors comprised of photosensitive elements that develop electronic signals corresponding to the intensity of the reflected light. These electronic signals are decoded by processing circuitry that recovers the digital information stored in the data tracks of the optical disk. Further details regarding the construction and use of optical disks in can be found in *Compact Disc Technology*, Nakajima, H. and Ogawa, H., translated by Aschmann, C., published by Ohmsha, Ltd., Japan (1992), and *The Compact Disc Handbook*, Pohlmann, K., 2d. ed., A-R Editions, 1992.

Because data is encoded sequentially along the data tracks of an optical disk, optical disk reading apparatus must be able to follow a particular track in order to be able to read the data encoded thereon. One of the problems encountered in reading data from an optical disk is that the data tracks typically exhibit eccentricity, which may cause the distance between a data track and the disk center to vary by as much as 70 microns. To read information from an optical disk, the apparatus must be able to accommodate this eccentricity during the retrieval of information.

In previously known optical disk readers, the image detector is mounted on an optical pickup which reads from one data track at a time. The optical pickup typically includes lenses for focusing the light from the light source to particular portions of the disk surface, and for reflecting light from the reflective disk surface to the image detector, as described, for example, in the aforementioned *Compact Disc Technology* text at Chapters 6 and 7, which are incorporated herein by reference.

In such previously known systems, tracking is generally accomplished using the well-known "twin spot" method, as described, for example, at pp. 133–136 of the above-incorporated text. In this method, secondary beams from the light source are projected onto the optical disk ahead of and behind the main illumination beam, and slightly off-axis from the main illumination beam. Thus, tracking detectors associated with the secondary beams "see" only the non-pitted reflective surface of the optical disk when the main illumination beam is centered over the data track. An error signal is then developed as the difference between the signals generated by the tracking detectors. That error signal is provided to a servo-motor controlling movement of the pickup.

The increased availability of CD-ROM, and the development of MMCD, SD and DVD products, coupled with the availability of increasingly faster microprocessors, has created the need for ever faster optical disk drives. As a result, disk drives capable of operating at multiples of a standard single speed drive are becoming available, for example, 2×, 4× and even 6× drives. For a 6× (six times single speed) disk drive, the disk is rotated at speeds up to 2400 rpm when reading the innermost data track.

The ability to achieve even greater speeds may soon be limited by the ability of such technology to continue to provide low-cost, easily manufacturable systems, since the use of greater disk rotational speeds will require more sophisticated, higher tolerance, and thus more expensive, designs than employed in previously known arrangements.

An alternative to simply increasing the disk rotational speed is to read multiple data tracks simultaneously, as described in commonly assigned U.S. Pat. No. 5,426,623, the entirety of which is incorporated herein by reference. In accordance with the methods and apparatus provided therein, for example, ten adjacent data tracks may be read simultaneously. Thus, even if the disk is rotated at only twice standard speed (i.e., a 2× drive is used), the capability to read multiple tracks provides the equivalent of a 20× drive— more than a factor of three faster than previously known disk drives.

Implementation of simultaneous multiple track reading capability for optical disks presents new problems, however, relating to tasks such as focussing and tracking. For example, with development of MMCD and DVD formats, ever more data is being compressed onto a single disk. Thus, for example, the track pitch for the MMCD system is only about one-half that of the CD-format, and includes shorter pit lengths and faster rotation speed that increase the linear velocity from about 1.4 m/s to 4 m/s.

In "Parallel Optical Memories", BYTE magazine, September 1992, at p. 179, by Demetri Psaltis, a system is described which enables parallel access to optical disk tracks using a CCD detector to receive images formed by a wide-area illumination beam. As also described in "Optical memory disks in optical information processing" Applied Optics, Vol. 29, No. 14, May 10, 1990, by Demetri Psaltis, and in U.S. Pat. No. 5,111,445, this system encodes information in different formats in radial and tangential directions on the optical disk, so that it may be decoded without the aid of focussing optics.

In view of the foregoing, it would be desirable to provide improved electronic tracking methods and apparatus, for use with apparatus capable of simultaneously reading multiple data tracks using an image detector, that generate an electronic tracking signal based on the output of the image detector.

It further would be desirable to provide improved electronic tracking methods and apparatus, for use with apparatus capable of simultaneously reading multiple data tracks, that reduces cross-talk in the signals representative of data contained in adjacent data tracks of the optical disk.

It would be yet further desirable to provide improved electronic tracking methods and apparatus, for use with apparatus capable of simultaneously reading multiple data tracks, that permits reduction in the data readout error rate.

SUMMARY OF THE INVENTION

In view of the foregoing, it is an object of this invention to provide improved electronic tracking methods and apparatus, for use with apparatus capable of simultaneously reading multiple data tracks using an image detector, that generate an electronic tracking signal based on the output of the image detector.

It is a further object of the present invention to provide improved electronic tracking methods and apparatus, for use with apparatus capable of simultaneously reading multiple data tracks, that reduces cross-talk in the signals representative of data contained in adjacent data tracks of the optical disk.

It is another object of this invention to provide improved electronic tracking methods and apparatus, for use with apparatus capable of simultaneously reading multiple data tracks, that permits reduction in the data readout error rate.

These and other objects of the invention may be accomplished in accordance with the following methods and apparatus, suitable for use with multiple track reading apparatus as described in U.S. Pat. No. 5,426,623, which is incorporated herein by reference in its entirety, or in concurrently filed, copending and commonly assigned U.S. patent application Ser. No. 08/559/429.

In accordance with the principles of this invention, for an optical disk having distance D between track centers, and disk reading apparatus including an image detector formed of a matrix of pixels having a distance d between centers, each with a predetermined point spread function ("PSF"), a series of simultaneous equations may be generated based on sampled pixel data. This series of equations, when solved, provides an offset value $X_0$ and the corrected values of the image data corresponding to the tracks read by the image detector. An electronic tracking function may then be implemented by correcting the optical pickup head position to maintain the offset value $X_0$ at a given value.

Further in accordance with the present invention, a series of equations may be generated, based on sample pixel readout values and a series of weighting coefficients, such that, when simultaneously solved using linear algebraic or iterative techniques, the position of a selected track $I_0$ may be determined. By continually updating this analysis, the position of optical pickup head may thereafter be adjusted to maintain its position relative to track $I_0$.

The present invention also provides for computing minimum values of the weighting coefficients used to determine track location, and for obtaining the minimum value after integrating the image detector signals over a plurality of time intervals.

Further features of the invention, its nature and various advantages will be more apparent from the accompanying drawings and the following detailed description of the preferred embodiments.

DETAILED DESCRIPTION OF THE INVENTION

Figure 1:
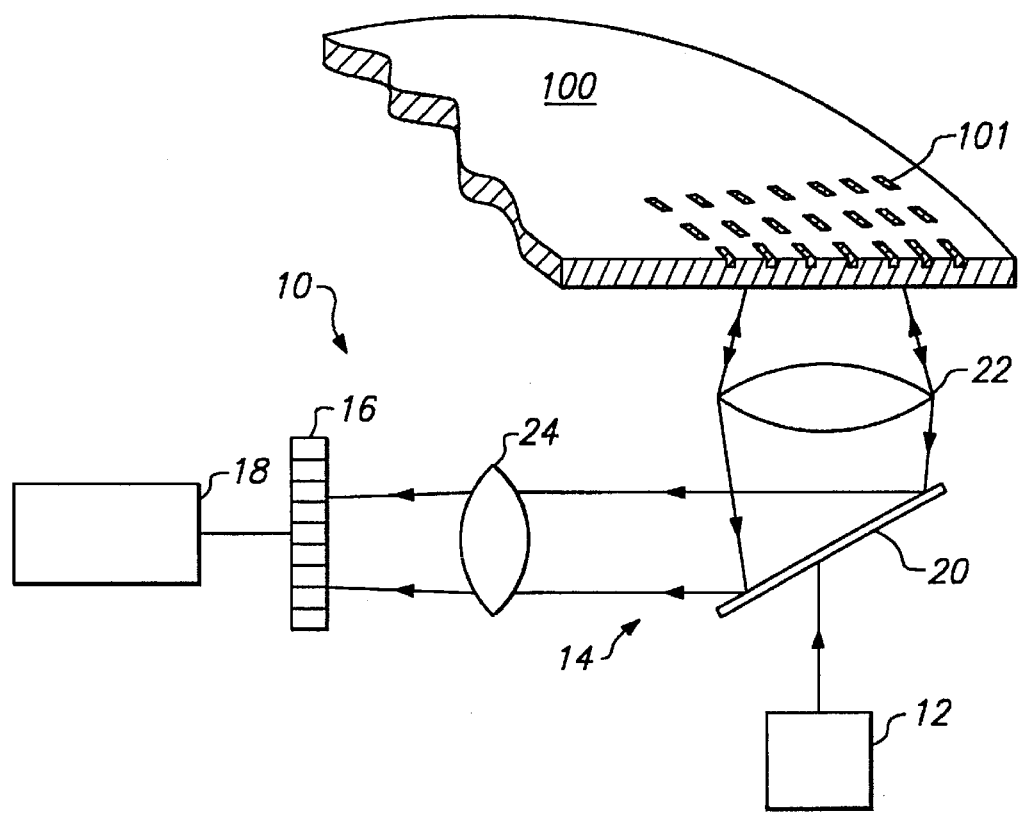
FIG. 1 is an illustrative block diagram of a multiple track reading apparatus constructed in accordance with the present invention.

Referring to FIG. 1, apparatus 10 for simultaneously reading multiple data tracks in accordance with a preferred embodiment of the present invention is described. Apparatus 10 includes illumination source 12, optical system 14, detector matrix 16 and image processing unit 18. Illumination source 12 projects a wide-area beam of illumination towards optical system 14, which is projected onto an information bearing surface of optical disk 100.

Optical system 14 illustratively includes beam splitter 20, objective lens 22 and tube lens 24. Beam splitter 20 permits the wide-area illumination beam from illumination source 12 to be projected on optical disk 100, while the light reflected from optical disk 100 to beam splitter 20 is directed to tube lens 24. The light beam passing through tube lens 24 is directed to image detector 16.

Image detector 16 comprises a plurality of picture elements (pixels) arranged in a form of a matrix. Preferably, image detector 16 is of the charge-coupled device (CCD) or CCD time-integration delay (CCD/TDI) type, as described, for example, in commonly assigned U.S. Pat. No. 5,426,623, the specification of which is incorporated herein by reference. Image detector 16 is positioned within the focal plane of optical system 14, so that the light beam projected on image detector 16 is converted to electric signals representative of the information bearing pits located on optical disk 100. The electric signals generated by image detector 16 are then processed in image processing unit 18, in accordance with the present invention, to provide readout and tracking of the data on optical disk 100.

As illustrated in FIG. 1, optical disk 100 comprises a plurality of information-bearing pits 101 arranged in circular or spiral tracks. When optical disk 100 is imaged by optical system 14 onto image detector 16, a single track (or pit within a track) is imaged by at least one pixel. In a preferred embodiment of the invention, each information bearing pit in a track is imaged by 3 to 4 pixels.

When optical disk 100 is rotated, information bearing pits ("data spots") 101 are swept along a direction perpendicular to the direction of the line of pixels in the image detector. In a CCD/TDI image detector, such as described in the above-incorporated patent, this direction corresponds to the TDI direction. During rotation, light collected from the pixels in the CCD/TDI image detector (along the TDI direction) is accumulated. The output of the signals from these pixels may be used to develop a representation of the location of the track and between-track portions of optical disk 100.

Figure 2:
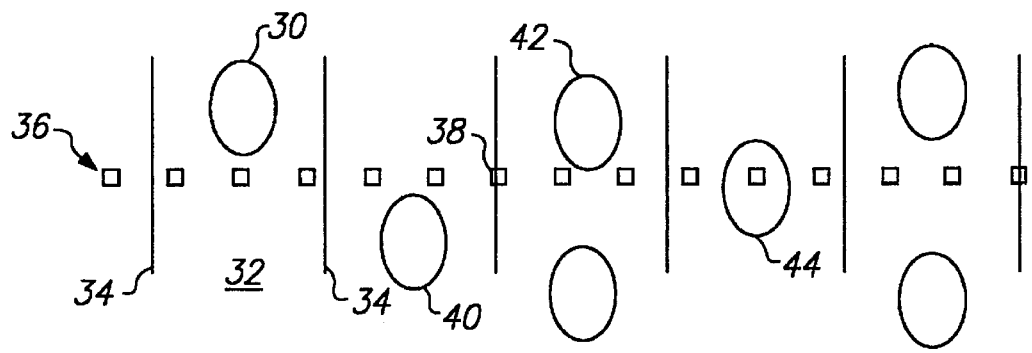
FIG. 2 illustrates the positioning of data spots located on an optical disk and track boundaries projected onto the pixels of a detector matrix of the apparatus of FIG. 1.

Referring now to FIG. 2, correspondence between the positions of the data spots on optical disk 100 and the pixels of image detector 16 is described. Data spot 30 is imprinted on track 32 having boundaries 34 imaged by several pixels in line of pixels 36. In practical optical systems, a certain amount of "smear" in the image is created due to diffraction effects, irregularities in optical system 14, and noise in image detector 16. This smear may be expressed in terms of a Point Spread Function ("PSF"), which typically takes the form of a Gaussian function, and represents the optical response of a pixel as a function of the distance from the mid-point of the pixel. The PSF for each pixel generally is available either from the manufacturer of the detector matrix, or may be determined by testing.

Due to the proximity of the tracks one to another (generally a pitch of about 1.6 μm in CD-ROMS and about 0.84 μm in the proposed MMCD format) and the image smear, any pixel in the line of pixels 36, such as pixel 38, may collect radiation from at least two neighboring data spots, such as data spots 40 and 42.

Pixel 38 may also collect radiation from data spots in more distant tracks, such as data spots 30 and 44. However, the contribution of second order neighboring data spots, such as spots 30 and 44, or higher order neighbors, is smaller than the contribution of the first order neighboring spots. Consequently, for any pixel, the contributions of neighboring data spots depends upon the PSF of the pixels, and on the lateral distance of the neighboring data spots from that pixel.

Since the contributions of immediately neighboring data spots may be significant, failure to include these contributions may cause misalignment of tracks, resulting in discontinuous track readouts, as well as the mis-detection of non-data spots as data spots. In such cases significant readout errors are generated and the read-data error rate is increased. The present invention is therefore directed to providing methods for modifying the readout values of a pixel to enable accurate tracking and reading by verifying contributions of signals received from data spots in the vicinity of a pixel.

Figure 3A:
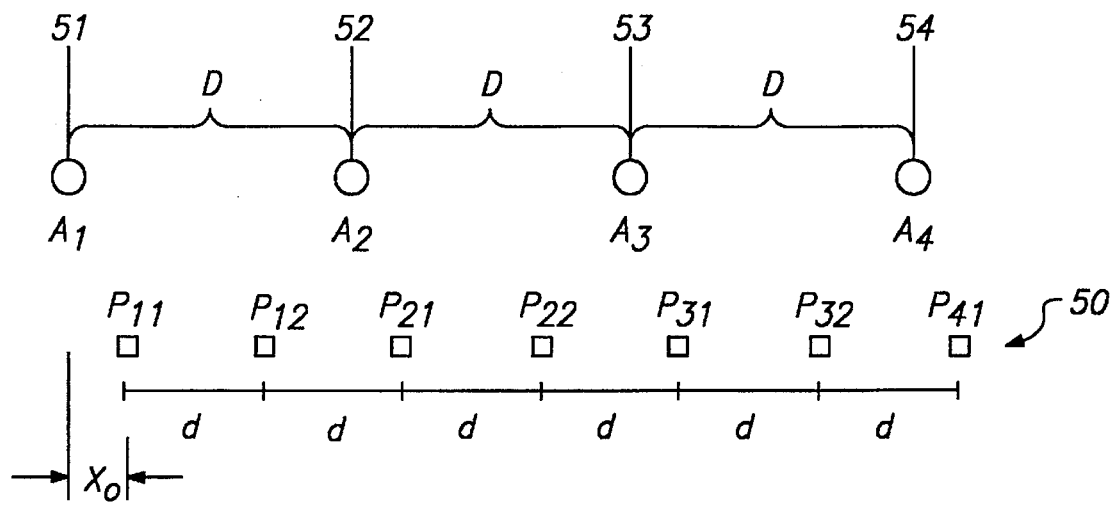
FIGS. 3A and 3B provide illustrative arrangements of a series of tracks in an optical disk correlated to a line of starting pixels of an imaging detector.
Figure 3B:
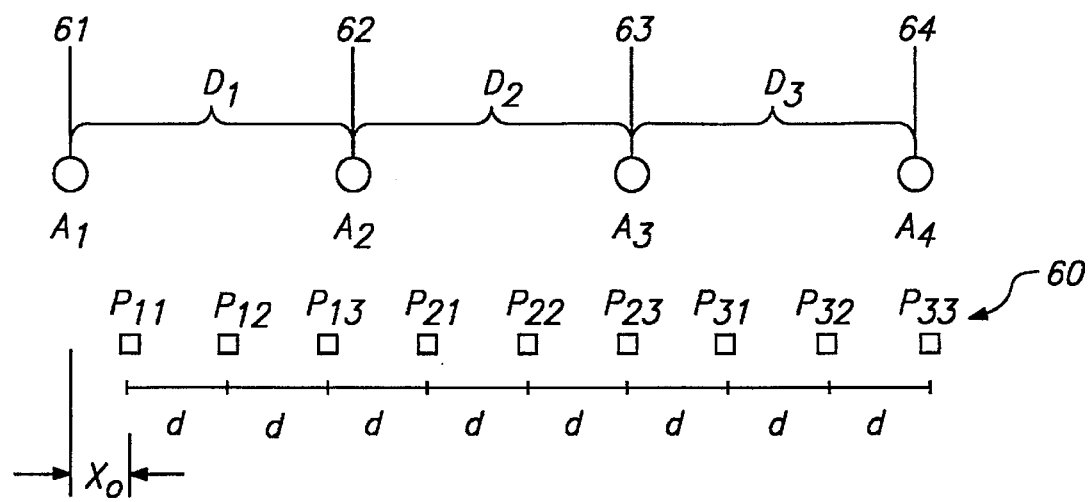

Referring now to FIGS. 3A and 3B, the present invention is illustratively described in the context of detector matrix 16 as described hereinabove. The methods described hereinafter are equally applicable to any line of pixels in a detector matrix; to simplify the following discussion, only the first line of pixels of the detector matrix is discussed.

In FIGS. 3A and 3B, an individual pixel in a line of pixels 50 of the detector matrix is indicated by an integer number j, wherein j=1, . . . ,N. The distance between the centers of any two adjacent pixels along line of pixels 50 in the detector matrix is indicated by d, and d is assumed to be a known constant value. The value of d is generally known from the manufacturer's specifications for the detector matrix, or may be determined by inspection of the detector matrix. Alternatively, if d varies, a table of values of d may be generated for the detector matrix and the appropriate values used in the equations described hereinbelow.

Tracks 51, 52, 53 and 54 are indicated by an integer number i, wherein i=1, . . . ,K and K is the total number of tracks. The distance between the center of a track and the center of an adjacent track along a radius in the optical disk, which is typically equal to the track pitch, is indicated by D. Generally, the position of the tracks and the pixels is not correlated, so that at least part of the tracks is not directly viewed by the pixels. While the track pitch may vary due to inaccuracies in production processes, it may be assumed that the change in track pitch in any group of 4–5 consecutive tracks is not substantial, so that D may be taken as constant over a group of 4 tracks. Alternatively, as described below, the methods of the present invention may be extended to handle cases where D varies.

The distances d between the centers of two pixels and the distance D between the centers of two tracks may also be considered in terms of spatial frequencies, where a spatial frequency is defined by an inverse of the distance between two points. Thus, the pixels have corresponding spatial frequency of 1/d and tracks have a spatial frequency of 1/D.

Referring again to FIG. 3A, every pixel j in the line of pixels has a readout signal Pi,j that depends upon the track i being imaged. This readout signal also includes contributions from tracks which are adjacent to track i. Readout values Pi,j are time dependent and vary as the tracks are rotated past the detector matrix.

Data spot signals are indicated by $A_i$, where i=1, . . . .K indicates the track number. Accurate tracking and detection requires that the position of a group of tracks be correlated with the position of a group of pixels to determine the values $A_i$. The correlation between a group of tracks and a group of pixels may be expressed in terms of a lateral offset distance $X_0$ (see FIG. 3A) between a pixel in the line of pixels and a corresponding imaged track.

In accordance with the methods of the present invention, offset distance $X_o$ and the values $A_i$ are determined for each group of tracks. These methods are applicable to groups of tracks having a constant pitch (i.e., distance between centers of two adjacent tracks), as well as to groups of tracks in which the track pitch varies between centers of any two adjacent tracks in a group. Once the value of $X_0$ is known, the location of other tracks may be computed based on $X_0$ and the track pitch D.

In FIG. 3A, tracks $A_1$–$A_4$ having a pitch D are imaged by two pixels per track, the pixels having a distance d between centers and readout values of Pi,j, respectively. Thus, for example, track $A_1$ is represented by readout signals $P_{11}$ and $P_{12}$. Given that the track pitch D and the PSF of the pixels is either known or measured and computed at the beginning of the readout process, and that the distance d is known from the specific design of the detector matrix, the value of the offset distance $X_0$ and values of three selected adjacent data spot signals $A_{INT}$, $A_{INT+1}$ and $A_{INT+2}$ (where INT is an integer having a value between 1 and one-half of the number of pixels in the line of pixels), may be found from the following set of equations:

for $k = INT$, $$A_k * PSF[X_0 + (2*k-2)*d - (k-1)*D] + A_{k+1} * PSF[K*D - X_0 - (2*k-2)*d] = P_{k,1} \quad (1)$$

$$A_k * PSF[X_0 + (2*k-1)*d - (k-1)*D] + A_{k+1} * PSF[k*D - X_0 - (2*k-1)*d] = P_{k,2} \quad (2)$$

and for $k = INT + 1$ $$A_k * PSF[X_0 + (2*k-2)*d - (k-1)*D] + A_{k+1} * PSF[k*D - X_0 - (2*k-2)*d] = P_{k,1} \quad (3)$$

$$A_k * PSF[X_0 + (2*k-1)*d - (k-1)*D] + A_{k+1} * PSF[k*D - X_0 - (2*k-1)*d] = P_{k,2} \quad (4)$$

where k is an index having an integer value between 1 and one-half of the number of pixels in the line of pixels, and $P_{k,1}$, $P_{k,2}$, with k having values as indicated in equations (1)–(4), are sampled pixel readout values. The values 1 or 2 of the second index of the readout values $P_{k,1}$, $P_{k,2}$ refer to whether the readout signal originates from either the first or second pixel positioned between the two adjacent tracks.

For example, application of equations (1)–(4), to a selected line of pixels for INT=1 results in the following set of equations:

$$A_1 * PSF(X_0) + A_2 * PSF(D-X_0) = P_{1,1} \quad (5)$$

$$A_1 * PSF(X_0 + d) + A_2 * PSF(D - X_0 - d) = P_{1,2} \quad (6)$$

$$A_2 * PSF(X_0 + 2*d - D) + A_3 * PSF(2*D - X_0 2*d) = P_{2,1} \quad (7)$$

$$A_2 * PSF(X_0 + 3*d - D) + A_3 * PSF(2*D - X_0 - 3*d) = P_{2,2} \quad (8)$$

from which the values of $X_0, A_1, A_2$ and $A_3$ may be obtained.

Since equations (1)–(4) form a set of 4 equations with 4 variables, the equations may be solved simultaneously using linear algebra or an iterative numerical technique for the values of $X_0$, $A_{INT}$, $A_{INT+1}$ and $A_{INT+2}$. Thus, the offset distance $X_0$ and the true data signals $A_{INT}$, $A_{INT+1}$ and $A_{INT+2}$ can be determined. The value of the data spot signals of the other tracks also may be found by solving at least one of equations (1) and (2) at respective values of k. Thus, for example, once $X_0$, $A_1$, $A_2$ and $A_3$ are known from equations (5)–(8), $A_4$ may be found by solving equations (1) or (2) with INT=3. The same is applicable for the rest of the tracks.

As will of course be appreciated, if the PSFs of the pixels are not equal, the PSF employed in each of the equations (1)–(4) will be different, but may be obtained by measurement of the PSF of each pixel prior to performing the readout process. Also, if the distances between centers of adjacent tracks are not constant, the exact values $X_o$ and $A_i$, i=1, . . . ,K may still be found by providing additional samples per track, i.e., sampling a track with at least 3 pixels instead of 2 pixels as illustrated in FIG. 3B.

Referring now to FIG. 3B, modified forms of equations (1)–(4) for use when imaging a track with line of pixels 60 having three pixels per track and variable track pitches $D_1$, $D_2$, . . . .Dn, where n is an index having integer values between 1 and K-1, are described. In this case the value of the offset distance $X_0$, the values of three selected adjacent data spot signals $A_{INT}$, $A_{INT+1}$ and $A_{INT+2}$ (where INT is an integer having a value between 1 and one-half of the number of pixels in line of pixels 60), and the values of $D_n$, for n=1,k with k being an integer having the values between 1 and INT+1, may be found from the following set of equations:

for k = INT $$A_k * PSF[X_0 + (3 * k - 3) * d - \Sigma D_{n,n=1,k-1}] + A_{k+1} * PSF[\Sigma D_{n,n=1,k} - X_0 - (3 * k - 3) * d] = P_{k,1} \quad (9)$$

$$A_k * PSF[X_0 + (3 * k - 2) * d - \Sigma D_{n,n=1,k-1}] + A_{k+1} * PSF[\Sigma D_{n,n=1,k} - X_0 - (3 * k - 2) * d] = P_{k,2} \quad (10)$$

$$A_k * PSF[X_0 + (3 * k - 1) * d - \Sigma D_{n,n=1,k-1}] + A_{k+1} * PSF[\Sigma D_{n,n=1,k} - X_0 - (3 * k - 1) * d] = P_{k,3} \quad (11)$$

and for k = INT + 1

$$A_k * PSF[X_0 + (3 * k - 3) * d - \Sigma D_{n,n=1,k-1}] + A_{k+1} * PSF[\Sigma D_{n,n=1,k} - X_0 - (3 * k - 3) * d] = P_{k,1} \quad (12)$$

$$A_k * PSF[X_0 + (3 * k - 2) * d - \Sigma D_{n,n=1,k-1}] + A_{k+1} * PSF[\Sigma D_{n,n=1,k} - X_0 - (3 * k - 2) * d] = P_{k,2} \quad (13)$$

$$A_k * PSF[X_0 + (3 * k - 1) * d - \Sigma D_{n,n=1,k-1}] + A_{k+1} * PSF[\Sigma D_{n,n=1,k} - X_0 - (3 * k - 1) * d] = P_{k,3} \quad (14)$$

where $P_{k,1}$, $P_{k,2}$, $P_{k,3}$ with k having the values as mentioned in equations (9)–(13), are sampled pixel readout values. The values 1, 2 or 3 of the second index of the readout values $P_{k,1}$, $P_{k,2}$, $P_{k,3}$ refers to the first, second or third pixel respectively, positioned between two adjacent tracks. Equations (9)–(13) form a set of 6 equations with 6 variables, and therefore may be solved for the offset distance $X_o$, the distances between the track centers $D_n$, l=1,INT and the true data signals $A_{INT}$, $A_{INT+1}$ and $A_{INT+2}$.

For example, equations (9)–(13) may be applied to a selected line of pixels for INT=1 to determine the values of $X_0, D_1, D_2, A_1, A_2$ and $A_3$. The values of additional data spot signals and distances between tracks then may be found by adding respective equations. Thus, $A_4$ and $D_3$ for example, may be found by solving the set of equations (9) and (10) with k=3, as shown in the following equations:

$$A_3 * PSF(X_0 + 6 * d - D_1 - D_2) + \\ A_4 * PSF(D_1 + D_2 + D_3 - X_0 - 6 * d) = P_{3,1} \quad (15)$$

$$A_3 * PSF(X_0 + 7 * d - D_1 - D_2) + \\ A_4 * PSF(D_1 + D_2 + D_3 - X_0 - 7 * d) = P_{3,2} \quad (16)$$

The same solution technique may then be applied for the rest of the tracks.

It is to be appreciated that all pixel readout values $P_{i,j}$ and data spot signals $A_i$ in equations (1)–(16) are time dependent. Accordingly, the values of $X_0$, $D_n$, $A_i$ determined from equations (1)–(16) are time dependent and may be recalculated each time the accumulated charge on the detector matrix is sensed so as to provide accurate continuous tracking.

Comparison of equations (1)–(4) and (9)–(14) shows that in general the system of equations may be generally represented as:

$$P_j = \Sigma A_i * PSF_j(\delta_{i,j}), \text{ for all } i, j$$

wherein: $P_j$ is an output of the $j^{th}$ pixel; $A_i$ is a signal representative of the data encoded in the $i^{th}$ data track; $PSF_j$ is the point spread function of the $j^{th}$ pixel; and $\delta_{i,j}$ is the lateral distance between the $i^{th}$ data track and the $j^{th}$ pixel.

For a constant inter-track spacing (track pitch D), $\delta_{i,j}$ is defined as:

$$\delta_{i,j} = |X_0 + (mi - n)d - (i-1)D|$$

wherein: $X_0$ is the lateral offset distance between a first one of the pixels and a first one of the adjacent data tracks; m is the ratio of track pitch to pixel pitch; n is given by the formula n=i mod j; d is the pixel pitch; and D is the track pitch.

Alternatively, for a variable track pitch, $\delta_{i,j}$ is defined as:

$$\delta_{i,j} = |X_0 + i*d - \Sigma D_k|, \text{ for all } k<=i$$

wherein: $X_0$ is the lateral offset distance between a first one of the pixels and a first one of the adjacent data tracks; d is the pixel pitch; and $D_k$ is the spacing between the $k^{th}$ and $k+1^{st}$ track.

In another aspect of the present invention, an approximate correlation between the position of a track and a pixel may be found. In this case, a pixel is found which is nearest to a track, thus determining the track position with a resolution corresponding to the distance between the track and the nearest pixel. Once the track positions are found, the true data spot signals may be determined.

Every pixel j, where j=1, . . . ,N is an integer indicating a pixel number, has a readout signal $P_j$ that represents a component of the modulated light reflected from neighboring tracks. The readout signal, or pixel sample value $P_j$, therefore may be expressed in terms of a summation, with different weights, over all neighboring data spots. If a track data spot signal is indicated by $A_i$, where i=1, . . . K, is the number of neighboring tracks, then for each pixel j the following equation applies:

$$P_j = \Sigma \alpha(j,i) * A_i, \; i=1, \ldots K \quad (17)$$

where $\alpha(j,i)$ is a matrix of coefficients representing different weight factors which are dependent upon the pixels PSF's and the distance of a pixel j from a data spot I. Coefficients $\alpha(j,i)$ are correlated with each data spot signal $A_i$ to provide the contribution of the data spot signal to pixel j.

To provide accurate tracking during the readout process of the optical disk, the position of a selected track, indicated by $I_0$, must be determined. Once the position of track $I_0$ is determined, the positions of the other tracks are also known, assuming equal spacing between tracks. If the distance between the tracks is not equal, the position of each track must be determined separately.

When the optical disk is sampled, values $P_j$ of a whole line of pixels are obtained. It is assumed that one of the pixels, indicated by $j_0$, where $j_0$ is a value yet unknown, is the nearest to the center of the selected track $I_0$. In order to determine the position of track $I_0$, $j_0$ must be found.

If, as in one embodiment of a detector matrix suitable for use with the present invention, a track is sampled by 4 pixels, then a coefficient C, which represents a first approximation to $\alpha$, may be found by computing the following minimum:

$$\text{Min}_j(P_j - C_0 * P_{j-2} - C_0 * P_{j+2}) \qquad (18)$$

where the pixels $j-2$ and $j+2$ determine expected boundaries of track $I_0$. As a first approximation, $\alpha(j_0, i_0) = C_0$, and since variations in $C_0$ are small and are mainly due to eccentricity of the optical disk, there is no need to update $C_0$ at high sampling rates.

If equation (18) is solved for every pixel j, $j=1, \ldots, N$, then for each track I four different values of $C_0$ are obtained, from which the value of $C_0$ is selected which provides the lowest minimum value of equation (18). On the other hand, if equation (18) is solved for only part of the pixels, for example, every four pixels, where a track is sampled by four pixels, then only one value $C_0$ is obtained for each track. However, greater confidence in the determination of the tracks can be obtained by solving equation (18) for all of the pixels in the line of pixels.

It will of course be understood that the above-described method may be readily applied where a different number of pixels is employed to image each track. For example, if a track is sampled by 6 pixels, then other pixels determine the boundaries of the track, such as pixels $j-3$ and $j+3$ respectively, and six different values of $C_0$ are obtained for each track, when equation (18) is solved for all the pixels in a line of pixels.

Once the values of $\alpha(j,i)$ and $P_j$ are known, the values of true data signals $A_i$ for each track I may be factorized from the set of equations (17). Sensitivity tests may additionally be conducted on each $C_0$ value by altering the value of $C_0$ (which is factorized from equation (18)) by a small amount and checking if the result still provides the pixel $i_0$.

For higher accuracy, a series of $C_0$ values may be tested in order to provide the smallest minimum value in equation (18). It is to be appreciated that the smaller the minimum value in equation (18), the more accurate the tracking achieved. This testing may take the form of checking values in a range $C_0 + LL*\delta$ and $C_0 - LL*\delta$, and interpolating to find a best fit. In this case $\delta$ is a small value and LL is an integer value. LL may be either fixed or determined by the user. The result of these tests provides a best estimate for $C_0$ which may be different from the first selected value. In addition, equation (18) may be integrated over time before finding the minimum, so that sampling errors are smoothed and the results are more stable and accurate.

It is to be appreciated that the method described hereinbefore provides approximate values for each $A_i$. In particular, the method prevents the accumulation of errors caused by different spacing between tracks and allows accurate location of a plurality of tracks.

Figure 4:
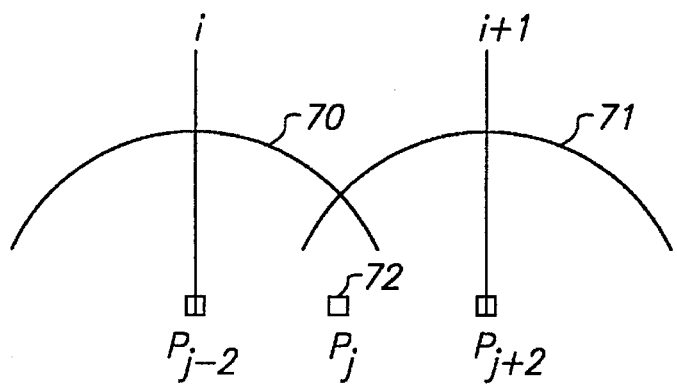
FIG. 4 shows illustrative radiation patterns impinging upon a row of pixels in a detector matrix used for imaging adjacent tracks of an optical disk.

Referring now to FIG. 4, application of the method of track determination described hereinabove is illustrated. In FIG. 4, $C_0$ is taken as 0.5, wherein pixel Pj receives part of the radiation from a data spot in track i and part of the radiation from a data spot in track i+1. Pixels $j-2$ and $j+2$ image two tracks and have corresponding readout values of $P_{j-2}$ and $P_{j+2}$, respectively. The light reflected from tracks i and i+1 produces radiation patterns 70 and 71, respectively. Pixel j senses radiation which may be less than the maximum values of radiation patterns 70 and 71.

Employing equation (18) with $C_0 = 0.5$ gives:

$$\text{Min }(P_j - 0.5 * P_{j-2} - 0.5 * P_{j+2}) \qquad (19)$$

To search for the best fit, a set of equations (19) is solved with $P_j$ being replaced by $P_{j-2}, P_{j-1}, P_{j+1}$ and $P_{j+2}$. In this set of equations, the best fit is obtained for the pixel whose readout value provides the lowest minimum value. For the arrangement depicted in FIG. 4, the lowest minimum is obtained in the equation for pixel readout value Pj, i.e. pixel j images boundary point 72 and pixels $j-2$ and $j+2$ image the two tracks respectively.

Sensitivity tests also may be performed by testing a series of $C_0$ values, preferably around the initial selection of $C_0 = 0.5$. In such a case, $C_0$ values ranging from $C_0 - \epsilon$ and $C_0 + \epsilon$ (where $\epsilon$ is a small value) may be tested and a $C_0$ whose value provides the lowest minimum in equation (19) is selected. Additionally or alternatively, the values of $P_j$, $P_{j-2}$ and $P_{j+2}$ may be integrated over time before taking the minimum in equation (18).

Figure 5:
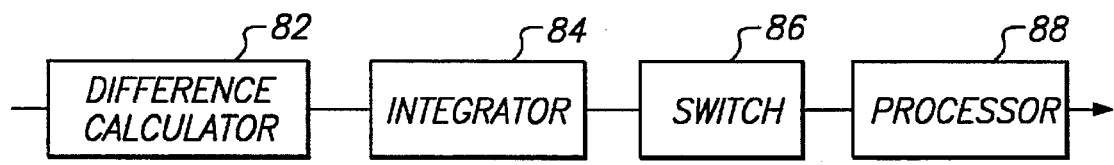
FIG. 5 is a block diagram of processing circuitry suitable for implementing the methods of the present invention.

Referring now to FIG. 5, apparatus 80 for enabling determination of the positions of tracks and data spot signals in an optical disk readout system, and implementing the methods described hereinabove, is described. In a preferred embodiment, apparatus 80 may form a part of image processing unit 18 of FIG. 1.

Apparatus 80 comprises difference calculator 82, integrator 84, sampler 86 and processor 88. Difference calculator 82 receives pixel readout values Pj, $j=1, \ldots, N$ from detector matrix 16 (see FIG. 1) and calculates equation (19) as described hereinabove. The output of difference calculator 82 is a local minima at a track boundary point, and is provided to integrator 84. Integrator 84 integrates the results of difference calculator 82 over time (i.e., several samples) to provide a stable minima.

The stable minima values of integrator 84 are then provided to sampler 86 which outputs a time varying sinewave-like function signal, compatible with the stable minima values of integrator 84. The time varying sinewave-like function signal is in turn provided to processor 88, which calculates the minima of time-varying function signal to determine the points corresponding to the track boundaries. Once the boundaries of a track are found, the track position is determined.

Processor 88 calculates the offset distance of each pixel from the nearest track and employs previously measured PSF values, as described hereinabove, to determine a set of coefficients $\beta(j,i)$ which are reciprocal to the coefficients $\alpha(j,i)$. Coefficients $\beta(j,i)$ may be used for solving the equation reciprocal to equation (17) to determine the true data spot signals $A_i$. Processor 88 may be implemented using a series of analog switches and comparators, or alternatively, may comprise a general purpose digital processor having digital switches.

While a preferred illustrative embodiment of the present invention is described above, it will be obvious to one skilled in the art that various changes and modifications may be made therein without departing from the invention and it is intended in the appended claims to cover all such changes and modifications which fall within the true spirit and scope of the invention.

What is claimed is:

1. A method of simultaneously tracking adjacent data tracks of an optical disk using a detector matrix having a plurality of pixels, the adjacent data tracks having locations and spaced apart by a track pitch, each one of the plurality of pixels generating a signal representative of a sum of contributions from data stored in the adjacent data tracks, the method comprising steps of:

generating a series of simultaneous equations wherein the signals for each one of the plurality of pixels neighboring the adjacent data tracks are equated to the contributions from the data stored in the adjacent data tracks;

solving the series of simultaneous equations to compute a contribution for each one of the adjacent data tracks and an offset distance between a selected one of the plurality of pixels and a center of one of the adjacent data tracks;

computing the locations of the adjacent data tracks as a function of the offset distance and the track pitch.

2. A method as defined in claim 1 wherein each one of the plurality of pixels has a location and a point spread function, the plurality of pixels having a pixel pitch, a predetermined number of the plurality of pixels being spaced within the track pitch, and the step of generating a series of simultaneous equations further comprises:

generating a series of simultaneous equations equal in number to the predetermined number of the plurality of pixels spaced within the track pitch, each one of the contributions being computed as product of a coefficient representative of a corrected signal for each one of the adjacent data tracks and the point spread function computed as a function of the track pitch, the pixel pitch and the offset distance.

3. The method as defined in claim 2 wherein the step of solving the simultaneous equations further comprises determining the offset distance and the coefficient for each one of the adjacent data tracks.

4. The method as defined in claim 2 wherein the point spread functions for at least some of the plurality of pixels differ.

5. The method as defined in claim 2 wherein the adjacent data tracks correspond to subsets of multiple data tracks, and the track pitch varies across a radius of the optical disk.

6. The method as defined in claim 2 further comprising repeating the steps of generating, solving and computing over a series of time intervals to track the locations of the adjacent data tracks.

7. The method as defined in claim 1 wherein the series of simultaneous equations comprises:

for $k = INT$,
$$A_k * PSF[X_0 + (2*k-2)*d - (k-1)*D] + \qquad (I)$$
$$\qquad A_{k+1} * PSF[k*D - X_0 - (2*k-2)*d] = P_{k,1}$$
$$A_k * PSF[X_0 + (2*k-1)*d - (k-1)*D] + \qquad (II)$$
$$\qquad A_{k+1} * PSF[k*D - X_0 - (2*k-1)*d] = P_{k,2}$$
and for $k - INT + 1$,
$$A_k * PSF[X_0 + (2*k-2)*d - (k-1)*D] + \qquad (III)$$
$$\qquad A_{k+1} * PSF[k*D - X_0 - (2*k-2)*d] = P_{k,1}$$
$$A_k * PSF[X_0 + (2*k-1)*d - (k-1)*D] + \qquad (IV)$$
$$\qquad A_{k+1} * PSF[k*D - X_0 - (2*k-1)*d] = P_{k,2},$$

to provide values of the corrected signal $A_{INT}$, $A_{INT+1}$ and $A_{INT+2}$ for each one of the adjacent data tracks and $X_0$ is the offset distance between a first pixel in the plurality of pixels and a first of the adjacent data tracks, d is the pixel pitch, D is the track pitch, PSF is the point spread function of the respective one of the plurality of pixels, k is an integer index having a value of between 1 and one-half of the plurality of pixels, INT indicates a selected integer having a value of between 1 and one-half of the plurality of pixels, and $P_{k,1}$, $P_{k,2}$ are the signals for each one of the plurality of pixels neighboring the adjacent data tracks for each selected value of k.

8. A method of tracking data tracks on an optical disk using a detector comprising a plurality of pixels, the data tracks having a track pitch, the plurality of pixels having a pixel pitch, wherein an output of each pixel is a function of an image of the optical disk projected onto the pixel, the image includes multiple adjacent data tracks, and wherein the pixel pitch is no more than one half the track pitch, the method comprising:

generating a series of simultaneous equations relating the outputs of the pixels to signals representative of data encoded in the multiple adjacent data tracks included in the projected image;

determining the output of each of the plurality of pixels; and solving the series of simultaneous equations to extract the signals representative of the data encoded in the multiple adjacent data tracks from the outputs of the pixels.

9. The method as defined in claim 8 wherein the step of generating the series of simultaneous equations comprises deriving multiple equations of the form:

$$P_j = \Sigma A_i * PSF_j(\delta_{i,j}), \text{ for all } i, j$$

wherein:

$P_j$ is an output of the $j^{th}$ pixel;

$A_i$ is a signal representative of the data encoded in the $i^{th}$ data track;

$PSF_j$ is a point spread function of a $j^{th}$ pixel; and $\delta_{i,j}$ is a lateral distance between an $i^{th}$ data track and a $j^{th}$ pixel.

10. The method as defined in claim 9 wherein the PSF is assumed to be zero for $\delta_{i,j}>$the track pitch.

11. The method as defined in claim 9 wherein $P_j$ is an average output of a $j^{th}$ pixel.

12. The method as defined in claim 9 wherein the pixel pitch is a constant.

13. The method as defined in claim 12 wherein the track pitch is a constant and the step of generating the series of simultaneous equations further comprises deriving at least four equations and where $$\delta_{i,j} = |X_0 + (mi-n)d - (i-1)D|$$

wherein:

$X_0$ is the lateral offset distance between a first one of the pixels and a first one of the adjacent data tracks;

m is the ratio of track pitch to the pixel pitch;

n is given by the formula n=i mod j;

d is the pixel pitch; and

D is the track pitch.

14. The method as defined in claim 13 wherein each $PSF_j$ is zero for $\delta_{i,j}>D$.

15. The method as defined in claim 12 wherein the track pitch is not constant and the step of generating the series of simultaneous equations comprises deriving at least six equations and further comprises deriving equations of the form:

$$\delta_{i,j} = |X_0 + i \cdot d - \Sigma D_k|, \text{ for all } k<=i$$

wherein:

$X_0$ is the lateral offset distance between a first one of the pixels and a first one of the adjacent data tracks;

d is the pixel pitch; and $D_k$ is the track pitch between a $k^{th}$ and a $k+1^{st}$ track.

16. The method as defined in claims 15 wherein each $PSF_j$ is zero for $\delta_{i,j} > D_k$.

17. A method for determining the location of a data track of an optical disk relative to a plurality of pixels of a detector matrix, the method for use in an optical disk reading apparatus including the detector matrix, the method comprising steps of:

generating with the plurality of pixels of the detector matrix a series of pixel readout values corresponding to a series of data spots on the multiple tracks;

applying a selected preliminary weighting coefficient to each one of the series of pixel readout values for pixels neighboring a selected pixel;

computing, for each one of the plurality of pixels, a value corresponding to the readout value for the respective pixel minus the sum, over all of the pixels neighboring the respective pixel, of the product of the selected preliminary weighting coefficient and the respective pixel readout values;

determining a track location corresponding to the location of the pixel for which the value is a minimum.

18. The method as defined in claim 17 wherein the minimum value is taken over a plurality of pixels readout values at different times.

19. The method as defined in claim 17 wherein the step of computing is performed over a plurality of values in the vicinity of the selected preliminary weight coefficient values to provide a plurality of minimum values, and a lowest minimum value from the plurality of minimum values is selected to determine the track location.

20. The method as defined in claim 17 wherein the minimum value is determined over an integration of a plurality of pixel readout values at different times.

21. Apparatus for representing locations of multiple adjacent data tracks of an optical disk comprising:

optical means for providing an image of a portion of multiple adjacent data tracks of the optical disk;

an image detector comprising a plurality of pixels onto which the image of the portion of multiple adjacent data tracks is projected, the plurality of pixels having a pixel pitch and generating signals representing data encoded on the optical disk;

means for processing the signals by generating and solving a series of simultaneous equations to determine an offset value between a selected track and a selected pixel of the plurality of pixels, and corrected values of the signals corresponding to the locations of the multiple data tracks; and means for computing the locations of the multiple data tracks based on the offset value and the track pitch.

22. Apparatus for representing locations of multiple adjacent data tracks of an optical disk comprising:

optical means for providing an image of a portion of multiple adjacent data tracks of the optical disk;

an image detector comprising a plurality of pixels onto which the image of the portion of multiple adjacent data tracks is projected, the plurality of pixels generating signals representing data encoded on the optical disk;

means for applying a selected preliminary weighting coefficient to each one of the series of pixel readout values for pixels neighboring a selected pixel;

means for computing, for each one of the plurality of pixels, a value corresponding to the readout value for the respective pixel minus the sum, over all of the pixels neighboring the respective pixel, of the product of the selected preliminary weighting coefficient and the respective pixel readout values; and means for determining a track location corresponding to the location of the pixel for which the value is a minimum.

* * * * *